UNITED STATES PATENT OFFICE.

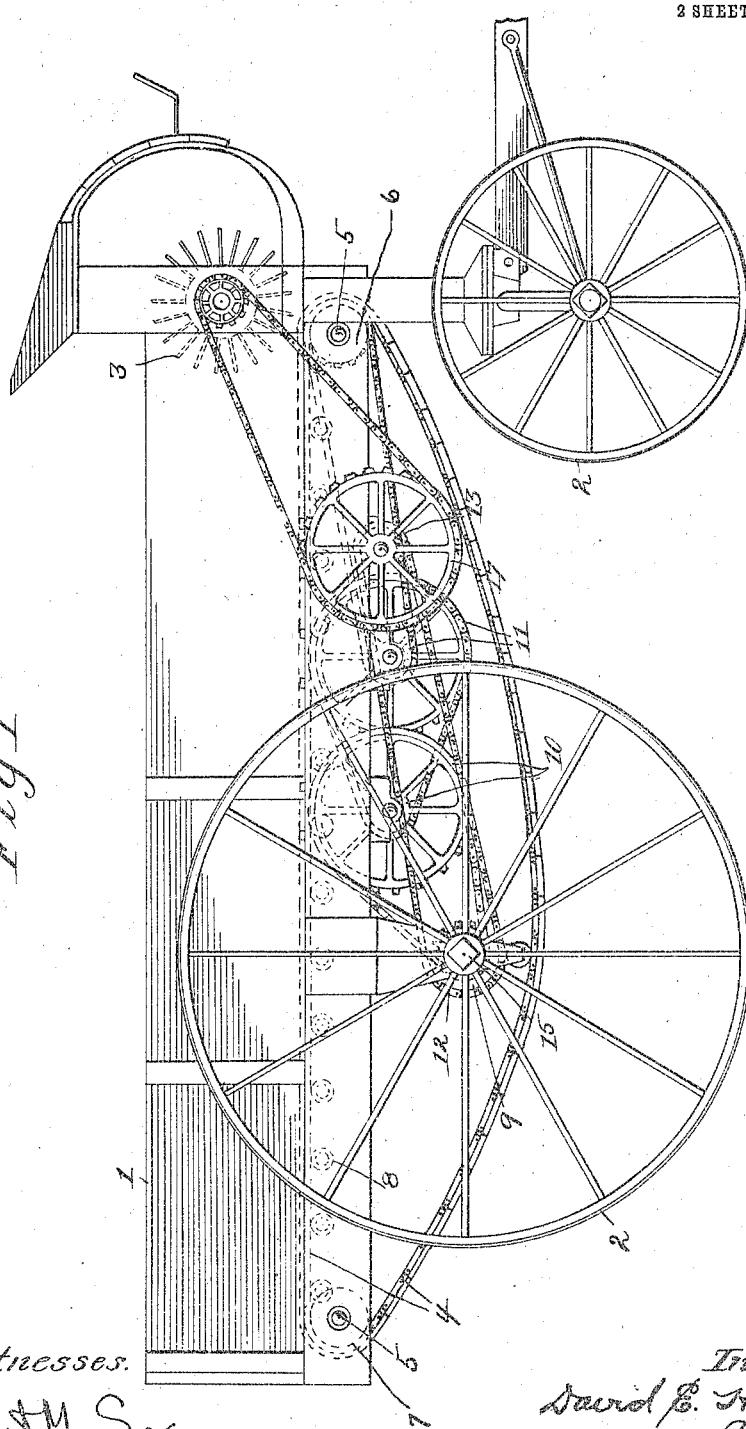

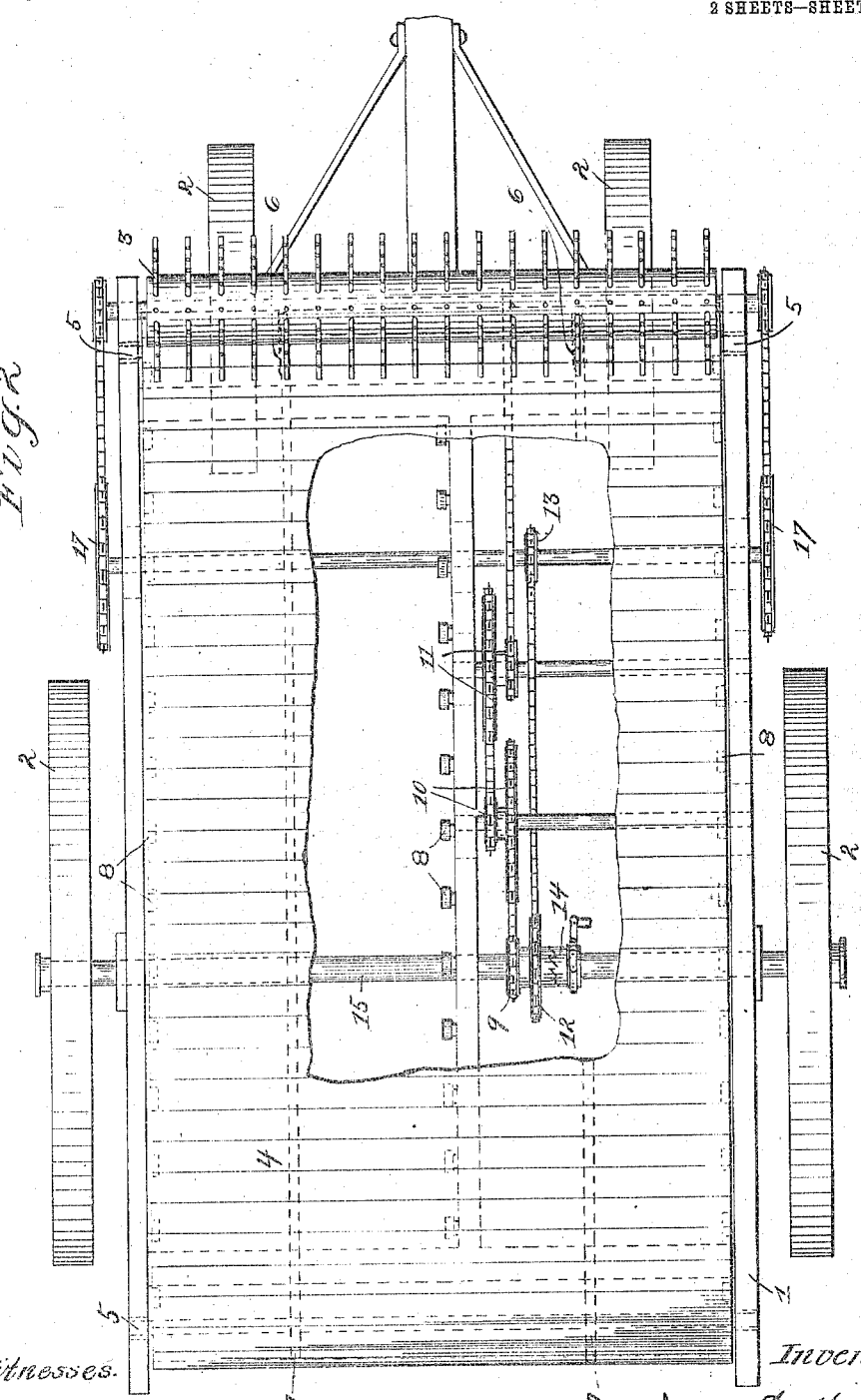

DAVID E. HOWATT, OF WILLOUGHBY, OHIO.

MANURE-SPREADER.

967,522.  Specification of Letters Patent. Patented Aug. 16, 1910.

Application filed March 26, 1910. Serial No. 551,613.

*To all whom it may concern:*

Be it known that I, DAVID E. HOWATT, a citizen of the United States, and a resident of Willoughby, county of Lake, and State of Ohio, have invented a new and useful Improvement in Manure-Spreaders, of which the following is a specification, the principle of the invention being herein explained and the best mode in which I have contemplated applying that principle, so as to distinguish it from other inventions.

My invention relates to machines for spreading manure.

Machines now upon the market designed for the use indicated are characterized by extreme complexity in their operation and by a consequent great liability to get out of order.

The objects of my invention are to provide a machine for the purpose under consideration which will be extremely simple in its structure and in its methods of operation, and which will hence be little liable to need repair.

Other objects of the invention are to make the draft of the machine easier, and to protect the driving mechanism from dirt and mud.

To the accomplishment of these and related ends, said invention, then, consists of the means hereinafter fully described and particularly pointed out in the claims.

The annexed drawings and the following description set forth in detail certain mechanism embodying the invention, such disclosed means constituting, however, but one of various mechanical forms in which the principle of the invention may be used.

In said annexed drawings:—Figure 1 is a side elevation of a machine embodying my invention, and Fig. 2 is a broken plan thereof, with certain parts removed.

The machine in which my invention is here embodied comprises the ordinary load-carrying box 1 mounted upon the usual wheels 2, and the whole is provided with a suitable seat and draft tongue. Disposed transversely across the front of the box 1 is a beater 3 which comprises a rotatable shaft provided with a plurality of radial pins and having secured thereto at one end a sprocket. A continuous apron 4 forms the bottom of the box; the apron 4 runs over two transverse rotatable shafts 5 disposed respectively at the front and rear of the box and provided with sprockets 6 and 7 which are engaged by chains carried by the apron: A plurality of small rollers 8 are secured along the bottom of the box and serve to support the apron 4 intermediate the shafts 5.

Two sprockets 9 and 12, formed integrally with each other, are mounted loosely upon the rear axle 15. Through intermediate sprockets 10 and 11, mounted on shafts journaled in the machine frame, the sprocket 9, by connecting chains, drives the forward shaft 5. The other sprocket 12 of the two integral sprockets, by intermediate sprockets 13 and 17, drives the beater 3. The sprockets 9 and 12 are loosely mounted on the axle 15, but are adapted to be connected to rotate with the axle by a clutch 14 operable through suitable connecting rods by the operator.

In operation the wagon is loaded with manure and is then pulled forward, the clutch being in disengaging position. When, then, the operator throws the clutch into engagement, the integral sprockets, through their intermediate chain and sprocket connections, will move the apron which forms the bottom of the box forwardly, and at the same time will rotate the beater forwardly. The intermediate chain and sprocket connections through which the apron is driven comprise successively larger sprockets so that the whole serves ultimately to drive the apron at a speed much slower than that of the driving axle. The beater on the other hand is driven at a comparatively high rate of speed because its intermediate driving sprockets are successively smaller. As the machine moves along, then, the load is slowly moved forwardly, and as it reaches the front end of the box it is loosened and scattered by the beater.

The many advantages attained in the machine as described, should be obvious. In the first place machines of this kind heretofore on the market are characterized by the fact that the movable bottom moves rearwardly and the beater is located at the rear end of the box. Therefore, the load becomes continually lighter at the front of the box, for as it diminishes, the load is moving rearwardly. Compared with the front end of the box, then, the rear end is becoming constantly heavier as the load is discharged, and it is well known that this serves to make the draft heavier and harder. I obviate this serious defect entirely by providing a forwardly moving bottom and a beater disposed at the front of the box. The load, therefore, is lightened gradually from the rear toward the front, and the draft becomes constantly easier. I have also cast aside all of the involved driving mechanism for the apron and the beater which is usually found in machines of this type, and have provided driving mechanism consisting simply of chain and sprocket connections. Furthermore, the driving sprockets, which drive the apron and the beater, are formed integrally and can be disconnected from the driving axle by disengagement of a single clutch; consequently the clutch may be thrown out and the whole load drawn along as simply a loaded wagon with no internal mechanism in operation at all. Finally it is to be noted that I employ a continuous apron for forming the bottom of the box, and the upper fold of the apron extends above the driving and intermediate sprockets, while the lower fold extends below them. Consequently the driving sprockets and chains are effectively protected from seepage of dirt and mud from the load, or from dirt thrown up from below.

It will, therefore, be seen that I have provided a machine characterized by extreme simplicity, for it comprises only a few simple parts and even these few parts are so arranged that they are subjected to no unnecessary operation, and are effectually protected from dirt and destructive wear. At the same time I have so disposed and arranged the operative mechanism that the machine is more easily drawn as the load is scattered.

Other modes of applying the principle of my invention may be employed instead of the one explained, change being made as regards the mechanism herein disclosed, provided the means stated by any of the following claims or the equivalent of such stated means be employed.

I therefore particularly point out and distinctly claim as my invention:—

1. In a spreader, the combination with the box and the rear axle, of two transverse shafts provided with sprockets, a continuous apron engaging said sprockets and forming a bottom for said box, two integral driving sprockets on the rear axle, intermediate sprockets driven by one of said driving sprockets and connected to rotate said shafts forwardly, a rotatable beater mounted at the front of said box, and an intermediate sprocket driven by the other of said driving sprockets and connected to rotate said beater forwardly.

2. In a spreader, the combination with the box and the rear axle, of two transverse shafts provided with sprockets, a continuous apron engaging said sprockets and forming a bottom for said box, two integral driving sprockets loose on the rear axle, a clutch for connecting and disconnecting said axle and sprockets, intermediate sprockets driven by one of said driving sprockets and connected to rotate said shafts forwardly, a rotatable beater mounted at the front of said box, and an intermediate sprocket driven by the other of said driving sprockets and connected to rotate said beater forwardly.

3. In a spreader, the combination with the box and the rear axle, of two transverse shafts provided with sprockets, a continuous apron engaging said sprockets and forming a bottom for said box, two integral driving sprockets loose on the rear axle, a clutch for connecting and disconnecting said axle and sprockets, intermediate sprockets driven by one of said driving sprockets and connected to rotate said shafts forwardly, a rotatable beater mounted at the front of said box, and an intermediate sprocket driven by the other of said driving sprockets and connected to rotate said beater forwardly, said apron extending above and below said driving and intermediate sprockets.

4. In a spreader, the combination with the box and the rear axle, of a rotatable shaft transversely disposed in said box, a continuous apron in said box and adapted to be moved by rotation of said shaft, a rotatable beater mounted at the front of said box, two integrally formed driving sprockets on the rear axle, and means connecting said sprockets with said shaft and beater respectively and arranged to rotate the same forwardly.

5. In a spreader, the combination with the box and the rear axle, of a transverse shaft provided with sprockets, a continuous apron engaging said sprockets, a rotatable beater mounted at the front of said box, two integrally formed driving sprockets on the rear axle, and means connecting said sprockets respectively with said shaft and beater and adapted to rotate the same forwardly.

6. In a spreader, the combination with the box and the rear axle, of a transverse shaft provided with sprockets, a continuous apron engaging said sprockets, a rotatable beater mounted at the front of said box, two integrally formed driving sprockets on the rear axle, and intermediate sprockets respectively driven thereby connected to rotate said shaft and said beater forwardly, the said driving and intermediate sprockets being disposed between the upper and lower folds of said apron.

Signed by me this 23rd day of March, 1910.

DAVID E. HOWATT.

Attested by—
ROBERT M. SEE,
ANNA L. GILL.